(12) United States Patent
Brockway

(10) Patent No.: US 6,364,373 B1
(45) Date of Patent: Apr. 2, 2002

(54) CORRUGATED PIPE ADAPTER AND CONNECTION SYSTEM

(75) Inventor: Robert D. Brockway, Bedford, NH (US)

(73) Assignee: NPC, Inc., Milford, NH (US)

( * ) Notice: Subject to any disclaimer, the term of this patent is extended or adjusted under 35 U.S.C. 154(b) by 0 days.

(21) Appl. No.: 09/699,264

(22) Filed: Oct. 27, 2000

Related U.S. Application Data

(60) Provisional application No. 60/161,861, filed on Oct. 27, 1999.

(51) Int. Cl.[7] .................................................. F16L 21/02
(52) U.S. Cl. ........................ 285/369; 285/236; 285/903; 285/253
(58) Field of Search ................................ 285/369, 903, 285/236, 253

(56) References Cited

U.S. PATENT DOCUMENTS

| | | | | |
|---|---|---|---|---|
| 4,141,576 A | * | 2/1979 | Lupke et al. | 285/903 |
| 4,702,502 A | * | 10/1987 | Shade et al. | 285/903 |
| 4,763,932 A | * | 8/1988 | Matz et al. | 285/903 |
| 4,871,198 A | * | 10/1989 | Hattori et al. | 285/903 |
| 5,072,972 A | * | 12/1991 | Justice | 285/903 |
| 5,163,717 A | * | 11/1992 | Wise | 285/903 |
| 5,180,196 A | * | 1/1993 | Skinner | 285/903 |
| 6,082,741 A | | 7/2000 | Gregoire et al. | 277/612 |

* cited by examiner

*Primary Examiner*—Eric K. Nicholson
(74) *Attorney, Agent, or Firm*—Bourque & Associates, P.A.

(57) ABSTRACT

A corrugated pipe adapter for providing a sealing surface on a corrugated pipe includes a generally cylindrical sleeve having a generally smooth outer clamping surface and at least one protrusion. The protrusions include side walls and an arched structure between the side walls. The protrusions extend from an inside of the generally cylindrical sleeve. The side walls move outwardly against the corrugations on the corrugated pipe when pressure is applied to the generally smooth outer clamping surface.

18 Claims, 3 Drawing Sheets

CORRUGATED PIPE ADAPTER AND CONNECTION SYSTEM

RELATED APPLICATIONS

This application claims the benefit of U.S. Provisional Application Serial No. 60/161,861 filed Oct. 27, 1999, fully incorporated herein by reference.

FIELD OF THE INVENTION

The present invention relates to adapters for pipes and, in particular, to a corrugated pipe adapter providing a smooth outside surface.

BACKGROUND OF THE INVENTION

Various arrangements exist for connecting pipes to manholes in sewer systems. One such arrangement is disclosed in greater detail in U.S. Pat. No. 3,958,313, incorporated herein by reference. According to this arrangement, a flexible boot slips over the free end of the pipe and an external clamp compresses the boot onto the pipe to produce a boot-to-pipe seal. The other end of the boot is sealed within an aperture in a manhole riser. These boots can also be used to secure and seal pipes to other structures, such as other pipes.

Initially, these boots were used solely with smooth pipes (e.g., PVC pipes) or semi-smooth pipes (e.g., concrete pipes). A new type of pipe has been developed, however, having a corrugated outer surface, often called corrugated polyethylene. The corrugations or ribs on the outer surface of the pipes prevent the use of the standard booted connection. Thus, a need exists for an adapter that provides a smooth outer surface that can be used, for example, with the standard boots.

Some plastic and rubber adapters have been designed for joints between corrugated pipes, but these plastic and rubber adapters are typically not economical and are often difficult to install. One prior art corrugated pipe adapter 10 is shown in FIG. 1. This corrugated adapter 10 has a generally cylindrical configuration and includes an annular protuberance or rib 12 having a hollow cross section. The rib 12 fits tightly between the corrugations 22 on the corrugated pipe 20. Because of the tight fit and relatively stiff materials, however, this prior art corrugated pipe adapter 10 is difficult to install. Because of the hollow cross section, this prior art corrugated pipe adapter 10 is also difficult to splice. Furthermore, the dies needed to form the hollow cross section make the adapter more expensive.

Another type of adapter is shown in FIG. 2 and disclosed in U.S. Pat. No. 5,180,196, incorporated herein be reference. This adapter 14 is used with a ribbed conduit 15 known by the name Ultra-Rib. This adapter 14 has a solid cross section with a number of protuberances 16 extending between projecting ribs 18 on a length of the ribbed conduit 15. This adapter 14 is not designed, however, for use with polyethylene corrugated pipe. This adapter also must be installed by inverting the adapter and rolling the adapter into position (as shown in FIG. 2).

Accordingly, a need exists for a corrugated pipe adapter that is less expensive, easier to stretch and to place over the corrugated pipe, and easier to splice.

SUMMARY OF THE INVENTION

The present invention features a corrugated pipe adapter including a generally cylindrical sleeve having a generally smooth outer clamping surface and one or more protrusions extending from an inner surface of the sleeve. The corrugated pipe adapter preferably has a solid cross section, and each protrusion has side walls which preferably extend only partially into the groove between corrugations on the corrugated pipe. Each of the protrusions preferably has an arched geometry and sloping side walls.

The present invention also features a corrugated pipe adapter comprising a generally cylindrical sleeve having a generally smooth outer clamping surface and at least two partial protrusions extending from an inside of the generally cylindrical sleeve. The partial protrusions have at least two side walls adapted to be positioned on either side of a single corrugation of the corrugated pipe. The generally cylindrical sleeve can also have an inner sealing surface including one or more sealing elements protruding therefrom.

The present invention also features a system including the corrugated pipe adapter used in conjunction with a boot and a clamping mechanism whereby the clamping mechanism secures the boot against the generally smooth outer clamping surface of the corrugated pipe adapter. The pressure applied to the corrugated pipe adapter causes the side walls to move outwardly against the corrugations on the corrugated pipe.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
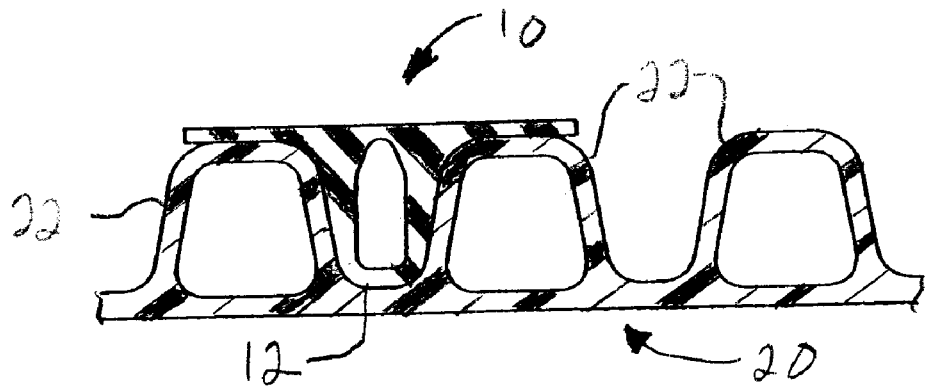
FIG. 1 is a cross-sectional view of a corrugated pipe adapter, according to the prior art, on a section of corrugated pipe.
Figure 2:
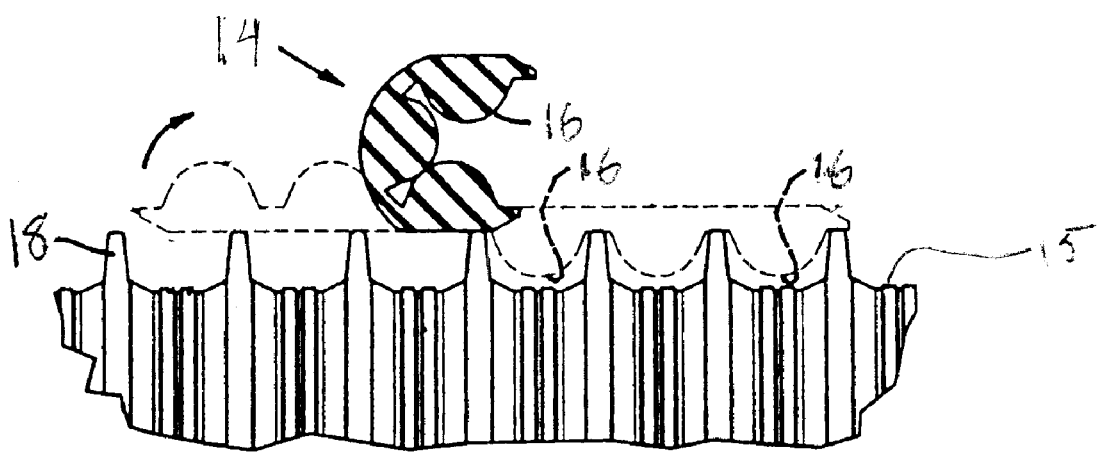
FIG. 2 is a partially cross-sectional view of a gasket adapter used on ribbed conduit, according to the prior art.
Figure 3:
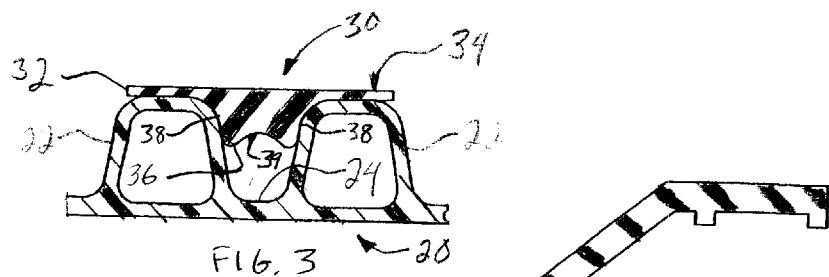
FIG. 3 is a cross-sectional view of a corrugated pipe adapter, according to the present invention.

The corrugated pipe adapter 30, FIG. 3, according to the present invention, is used with a corrugated pipe 20 having multiple corrugations 22 on an outer surface thereof. Although the corrugated pipe 20 is shown having corrugations 22 with a particular shape, the corrugated pipe adapter 30 of the present invention can be used with pipes having other types of corrugations or ribs on an outer surface thereof.

The corrugated pipe adapter 30 includes a generally cylindrical body portion or sleeve 32 having a generally smooth outer clamping surface 34. At least one protrusion or rib 36 extends inwardly from the body portion 32 between the corrugations 22 but preferably does not extend completely into the groove 24 between the corrugations 22. The corrugated pipe adapter 30 is preferably designed with a small enough cross section and tensile modulus such that the adapter 30 can be stretched over the end of the pipe 20. The corrugated pipe adapter 30 is preferably made from a medium durometer rubber (e.g., 40–50 Shore A). This type of rubber allows the corrugated pipe adapter 30 to be stretched over the corrugations 22.

The protrusion or rib 36 preferably includes sloping walls 38 and an arched center 39 that facilitate installation of the corrugated pipe adapter 30 by pulling or dragging over the convoluted surface of the pipe 20 in an axial direction. The use of the arch geometry achieves the desired stiffness and avoids having to use a stiff high durometer rubber, which is difficult to install. The corrugated pipe adapter 30 can be installed over the end of the pipe 20 by one individual stretching and sliding the adapter 30 in an axial direction. The corrugated pipe adapter 30 of the present invention does not require a specific method for installation such as rolling the adapter 30 on its back.

Figure 4:
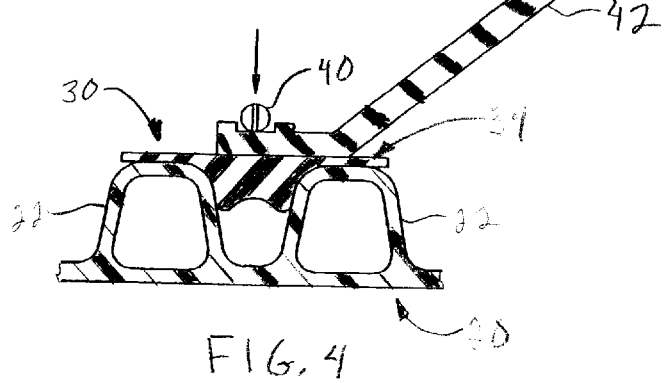
FIG. 4 is a cross-sectional view of a corrugated pipe adapter used with a boot according to one embodiment of the present invention.

In use, a connector hose clamp 40, FIG. 4, or other similar clamping mechanism clamps a boot 42 to the outer surface 34 of the corrugated pipe adapter 30. The cross section of the corrugated pipe adapter 30 is preferably stiff enough to act as a bridge to resist the flexural forces created by the hose clamp 40. When force is applied by the clamp 40 (as shown in FIG. 4), the arched center 39 causes the sloping walls 38 to distribute the force outwardly against the corrugations 22, thereby wedging the protrusion or rib 36 between the corrugations 22 and creating a watertight seal. When installed, the corrugated pipe adapter 30 only adds about ¼ inch to the outside diameter of the pipe 20. The pipe 20 can thus be used with standard connectors and manholes for most applications without requiring the user to switch to the next larger size.

In one example, the corrugated pipe adapter 30 is made by extruding the rubber and bonding or vulcanizing into rings of specific diameters. Since the cross section of the pipe 20 is different for different manufacturers and each diameter, the cross section of the corrugated pipe adapter 30 and protrusion or rib 36 may be designed differently. Examples of corrugated pipes on which the corrugated pipe adapter 30 can be used are made by Hancor, Inc. of Findlay, Ohio and by ADS of Columbus, Ohio.

Figure 5:
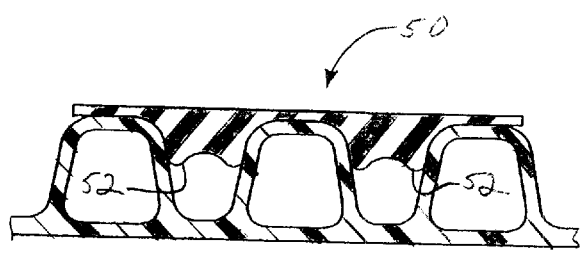
FIG. 5 a cross-sectional view of a long corrugated pipe adapter having multiple protrusions or ribs, according to another embodiment of the present invention.
Figure 6:
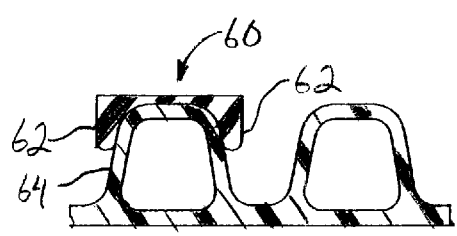
FIG. 6 is a cross-sectional view of a short corrugated pipe adapter, according to a further embodiment of the present invention.

In another embodiment, a corrugated pipe adapter 50, FIG. 5, designed for a small diameter corrugated pipe includes multiple protrusions or ribs 52. Although two protrusions or ribs 52 are shown, the corrugated pipe adapter 50 can include any number of protrusions or ribs. In a further embodiment, a corrugated pipe adapter 60, FIG. 6, designed for a larger diameter pipe includes partial protrusions or ribs 62 on either side of a single corrugation 64. These pipe adapters 50, 60 can be installed generally in the same manner as described above.

Figure 7:
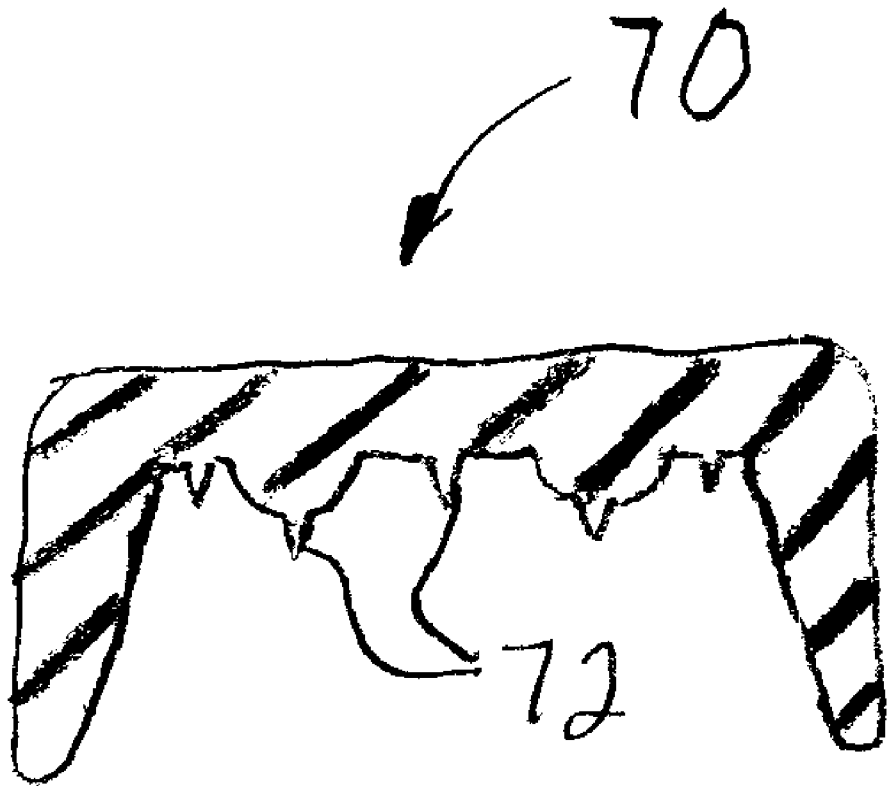
FIG. 7 is a cross-sectional view of a corrugated pipe adapter having sealing elements, according to yet another embodiment of the present invention.

A further embodiment of the corrugated pipe adapter 70, FIG. 7, includes sealing elements (fillets or lips) 72. Because the top surface of the corrugations 64 can be rough, the sealing elements 72 improve the seal between the corrugated pipe adapter 70 and the corrugation 64. Although the sealing elements are shown on a corrugated pipe adapter 70 designed for larger sizes of corrugated pipes, the sealing elements can also be used on the other corrugated pipe adapters 30, 50. Alternatively, a sealant can be used for pressure tight applications.

Accordingly, the present invention provides a corrugated pipe adapter that can easily be stretched and snapped into place over the corrugations of a corrugated pipe. The corrugated pipe adapter is less expensive to manufacture while providing sufficient strength.

Modifications and substitutions by one of ordinary skill in the art are considered to be within the scope of the present invention which is not to be limited except by the claims which follow.

What is claimed is:

1. A corrugated pipe adapter for providing a sealing surface on a corrugated pipe, comprising;
   a generally cylindrical sleeve having a generally smooth outer clamping surface; and
   at least one protrusion extending from an inside of said generally cylindrical sleeve, said at least one protrusion having side walls and forming an arched structure at an end of said protrusion and between said side walls, wherein said arched structure arches inwardly toward said clamping surface such that pressure applied to said generally smooth outer clamping surface opposite said arched structure causes said side walls to move outwardly against corrugations on said corrugated pipe.

2. The corrugated pipe adapter of claim 1 wherein said at least one protrusion extends partially into said corrugations on said corrugated pipe.

3. The corrugated pipe adapter of claim 1 wherein said corrugated pipe adapter has a solid cross section.

4. The corrugated pipe adapter of claim 1 wherein said generally cylindrical sleeve and said at least one protrusion are made of a medium durometer rubber.

5. The corrugated pipe adapter of claim 1 wherein said side walls are sloping.

6. The corrugated pipe adapter of claim 1 wherein said at least one protrusion includes a plurality of protrusions, and wherein each of said protrusions is adapted to be positioned between said corrugations on said corrugated pipe.

7. A corrugated pipe adapter for providing a sealing surface on a corrugated pipe, comprising:
   a generally cylindrical sleeve having a generally smooth outer clamping surface; and
   a plurality of protrusions extending from an inside of said generally cylindrical sleeve having sloping side walls and forming an arched structure at an end of each said protrusion and between said sloping side walls, wherein each of said plurality of protrusions are adapted to be positioned between corrugations on said corrugated pipe, and wherein each said arched structure arches inwardly toward said clamping surface such that pressure applied to said generally smooth outer clamping surface opposite said arched structure causes said sloping side walls to move outwardly against said corrugations on said corrugated pipe.

8. The corrugated pipe adapter of claim 7 wherein said generally cylindrical sleeve and said plurality of protrusions are made of a medium durometer rubber.

9. The corrugated pipe adapter of claim 7 wherein said corrugated pipe adapter has a solid cross section.

10. The corrugated pipe adapter of claim 7 wherein each said plurality of protrusions extends partially into a groove between said corrugations on said corrugated pipe.

11. A corrugated pipe connection system comprising:
   a corrugated pipe adapter comprising:
      a generally cylindrical sleeve having a generally smooth outer clamping surface; and
      at least one protrusion extending from an inside of said generally cylindrical sleeve, said at least one protrusion having side walls and forming an arched structure at an end of said protrusion and between said side walls;

a boot for positioning on said clamping surface; and a clamping mechanism securing said boot to said generally smooth outer clamping surface, and wherein said arched structure arches inwardly toward said clamping surface such that pressure applied by said clamping mechanism to said generally smooth outer clamping surface opposite said arched structure causes said side walls to move outwardly against corrugations on said corrugated pipe.

12. The system of claim 11 wherein said at least one protrusion extends partially into said corrugations on said corrugated pipe.

13. The system of claim 11 wherein said corrugated pipe adapter has a solid cross section.

14. The system of claim 11 wherein said side walls are sloping.

15. The system of claim 1 wherein said at least one protrusion includes a plurality of protrusions, and wherein each of said protrusions is adapted to be positioned between said corrugations on said corrugated pipe.

16. The corrugated pipe adapter of claim 1 further comprising at least one sealing element protruding from an inner sealing surface of said generally cylindrical sleeve.

17. The corrugated pipe adapter of claim 7 further comprising at least one sealing element protruding from an inner sealing surface of said generally cylindrical sleeve.

18. The corrugated pipe connection system of claim 11 further comprising at least one sealing element protruding from an inner sealing surface of said corrugated pipe adapter.

* * * * *